United States Patent [19]

Castelain et al.

[11] Patent Number: 5,147,438
[45] Date of Patent: Sep. 15, 1992

[54] AUXILIARY OXYGEN BURNERS TECHNIQUE IN GLASS MELTING CROSS-FIRED REGENERATIVE FURNACES

[75] Inventors: Robert J. Castelain, Godaryville; Luc Wouters, Schilde, both of Belgium

[73] Assignee: Union Carbide Industrial Gases Technology Corporation, Danbury, Conn.

[21] Appl. No.: 761,448

[22] Filed: Sep. 18, 1991

[51] Int. Cl.$^5$ ............................................. C03B 5/04
[52] U.S. Cl. ...................................... 65/135; 65/136; 65/346
[58] Field of Search ................ 65/134, 135, 136, 346, 65/347

[56] References Cited

U.S. PATENT DOCUMENTS

| | | | |
|---|---|---|---|
| 3,515,529 | 6/1970 | Love et al. | 65/136 X |
| 3,592,623 | 7/1971 | Shepherd | 65/136 |
| 4,473,388 | 9/1984 | Lauwers | 65/134 |
| 4,531,960 | 7/1985 | Desprez | 65/134 |
| 4,565,560 | 1/1986 | Krumwiede et al. | 65/134 |
| 4,599,100 | 7/1986 | Demarest | 65/134 |
| 4,725,299 | 2/1988 | Khinkis et al. | 65/134 |

FOREIGN PATENT DOCUMENTS

WO82/04246 12/1982 PCT Int'l Appl. .

OTHER PUBLICATIONS

Oxygen Enrichment in Glass Melting Furnaces Glass Jun. 1975 p. 187.
U.S. patent application Ser. No. 07/684,028, Lauwers, filed Apr. 13, 1991.

Primary Examiner—Robert L. Lindsay
Attorney, Agent, or Firm—Chung K. Pak

[57] ABSTRACT

The invention relates to the employment of at least one oxygen-fuel burner in a particular manner in glass melting cross-fired regenerative furnaces. By operating oxygen-fuel burners positioned in particular places in a cross-fired regenerative furnace in an appropriate manner, the glass melting can be accomplished without disrupting the flame momentum of the air-fuel burners, thereby improvidng the efficiency of the glass melting and increasing the production of the glass products.

9 Claims, 4 Drawing Sheets

AUXILIARY OXYGEN BURNERS TECHNIQUE IN GLASS MELTING CROSS-FIRED REGENERATIVE FURNACES

TECHNICAL FIELD

The invention relates to the employment of at least one oxygen-fuel burner in a particular manner in cross-fired regenerative furnaces to improve the efficiency of the glass melting, thereby increasing the glass production rate.

BACKGROUND OF THE INVENTION

Cross-fired regenerative furnaces have been commonly employed to manufacture glass. A typical cross-fired regenerative furnace has a melting chamber in which glass forming ingredients such as silica, boric oxide and other additives including stabilizers and fluxes, are heated by air-fuel burners which are placed along the lateral sides of the melting chamber. By combusting fuel in the presence of preheated air from a regenerator, the air-fuel burners provide heat to the atmosphere and walls of the melting chamber, which, in turn, heat the glass forming ingredients in the melting chamber by convection and radiation. Although the thermal efficiency of this heating process is relatively high, the glass production rate may decrease with time because of decreasing regenerator performance and increasing wall losses. The performance of the regenerator, for example, may be deteriorated when the regenerator is partially plugged or partially destroyed due to the presence of chemical contaminants in the resulting combustion gases which pass through the regenerator.

An oxygen enrichment technique has been proposed for increasing the melting capacity of a cross-fired regenerative furnace. The technique involves introducing oxygen in an area of the furnace where a fuel is being combusted in the presence of air. This technique, however, has a number of disadvantages. First, the addition of oxygen has no concentrated effect on a specific area, such as the batchline or in the vicinity thereof, where a high temperature condition is needed to melt floating solid glass batch. The consumption of oxygen is, therefore, high for a low glass production increase. Second, the air flames, which are at a high temperature due to the presence of oxygen, radiate more heat to the roof of the melting chamber. When the roof is subject to such a condition for a long period, its useful life could be reduced.

The use of oxygen-fuel auxiliary burners in a number of glass making furnaces has also been proposed. For instance, oxygen-fuel auxiliary burners have been employed on the sides of a rectangular melting chamber of a conventional U-shape flame regenerator furnace to assist the melting process. However, oxygen-fuel auxiliary burners have not been employed successfully in a cross-fired regenerative furnace. The major factor which is hindering their use in a cross-fired regenerative furnace is the difficult and restricted access to the furnace melting space. This access normally consists of a small (1 m wide) corridor between the regenerators and the melting furnace, not allowing the conventional installation of oxygen-fuel auxiliary burners.

It is, therefore, an advantage of the present invention in installing oxygen-fuel auxiliary burners in a cross-fired regenerative furnace in such a manner to accommodate the restraints imposed by the regenerators.

It is another advantage of the invention in installing oxygen-fuel auxiliary burners in a cross-fired regenerative furnace without drilling any holes in the refractory lining of the furnace.

It is yet another advantage of the invention in maintaining a particular glass production rate even when the regenerators of the furnace are partially plugged or destroyed, or are being repaired.

It is an additional advantage of the invention in increasing the glass production rate without consuming excessive amounts of oxygen and fuel and without overheating the roof of the furnace.

It is a further advantage of the invention in being able to employ non water-cooled oxygen-fuel auxiliary burners.

SUMMARY OF THE INVENTION

According to the present invention, the above advantages and other advantages apparent to those skilled in the art are obtained in a cross-fired regenerative furnace having at least two regenerators which communicate with a melting chamber through a plurality of ports along the lateral sides of the melting chamber having a bottom, a roof, side-walls, glass forming ingredients inlet means and molten glass outlet means, wherein glass forming ingredients and the resulting melt in the melting chamber are heated with burners placed under or adjacent to some or all of said plurality of ports, said burners comprising air-fuel burners and at least one oxygen fuel auxiliary burner positioned to heat a specific area in the melting chamber without substantially disrupting the flame momentum of said air-fuel burners. The flame momentum of the air-fuel burners, for example, is not disrupted when at least one oxygen-fuel auxiliary burner placed under or adjacent to the ports fires its flame toward the same direction as the air-fuel burners, substantially parallel to the air flames, following the firing sequence of the air-burners.

At least one oxygen-fuel auxiliary burner generally comprises a tube coaxially placed within a cylindrical pipe. The first ends of said tube and pipe terminate in a nozzle tip while the second ends of said tube and pipe are connected to and are in communication with a fuel providing means and an oxygen providing means, respectively. The oxygen-fuel auxiliary burner may be bent or angled to direct its flame toward a specific area in the melting chamber, such as the batchline.

The modified refractory block and oxygen fuel auxiliary burner are preferably placed under the port or in the vicinity of a port which is close to batchline. The number of modified refractory blocks employed corresponds to the number of oxygen fuel auxiliary burner employed. The number of oxygen fuel employed may be such that the furnace could be operated entirely with oxygen-fuel burners.

As used herein, the term "the batchline" means the interface of the solid, unmelted glass forming ingredients and the molten glass in the melting chamber.

As used herein, the term "flame momentum" means the direction, movement or pattern of a flame flow.

DETAILED DESCRIPTION OF THE INVENTION

The invention relates to the use of oxygen-fuel auxiliary burners with a cross-fired regenerative glass making furnace to provide heat more efficiently to melt batch raw glass forming ingredients. The invention further comprises employing at least one modified refractory block which can enhance the operation of auxiliary oxygen-fuel burners.

Figure 1:
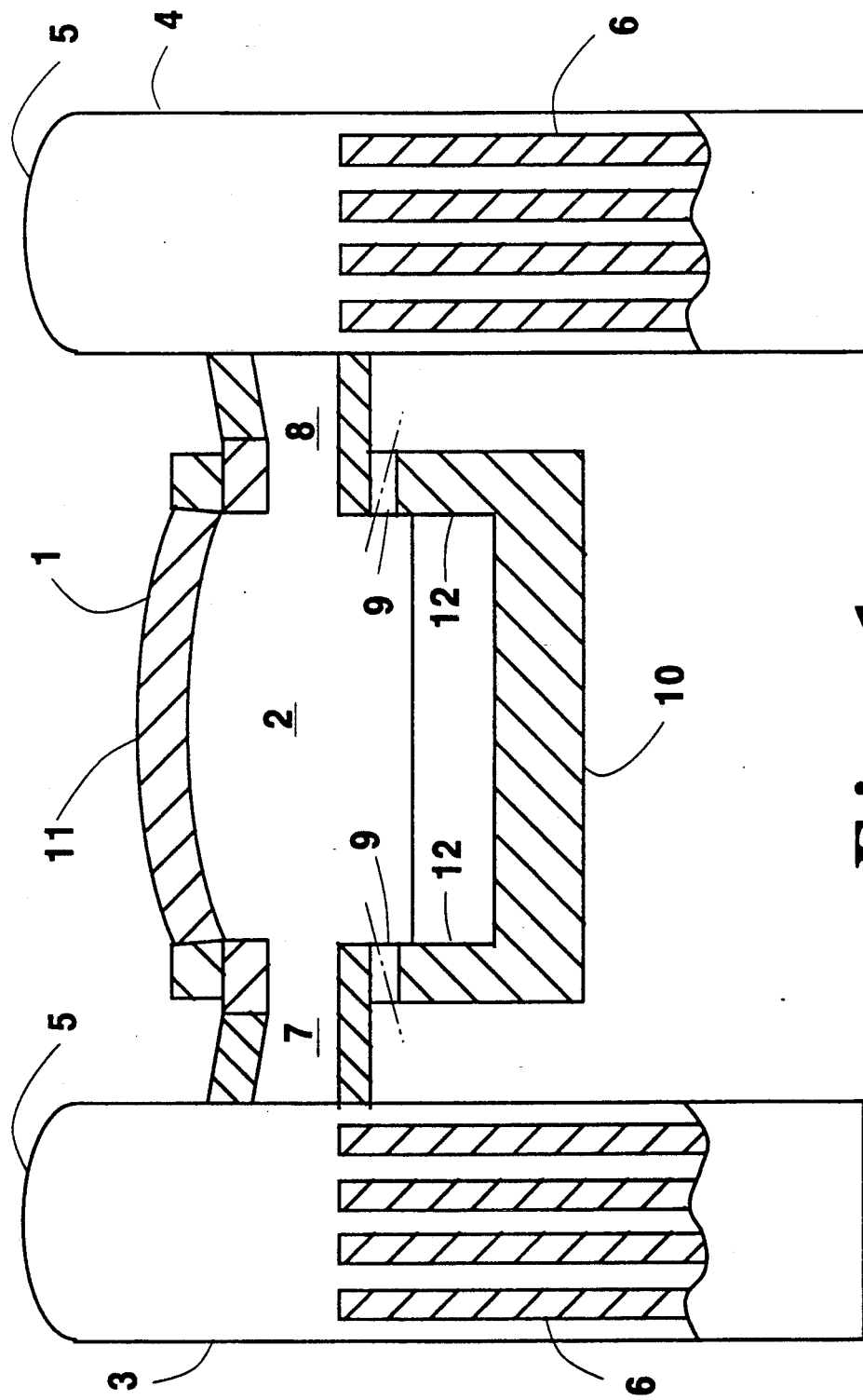
FIG. 1 is a lateral cross-sectional view of one embodiment of the cross-fired regenerative furnace of the present invention.
Figure 2:
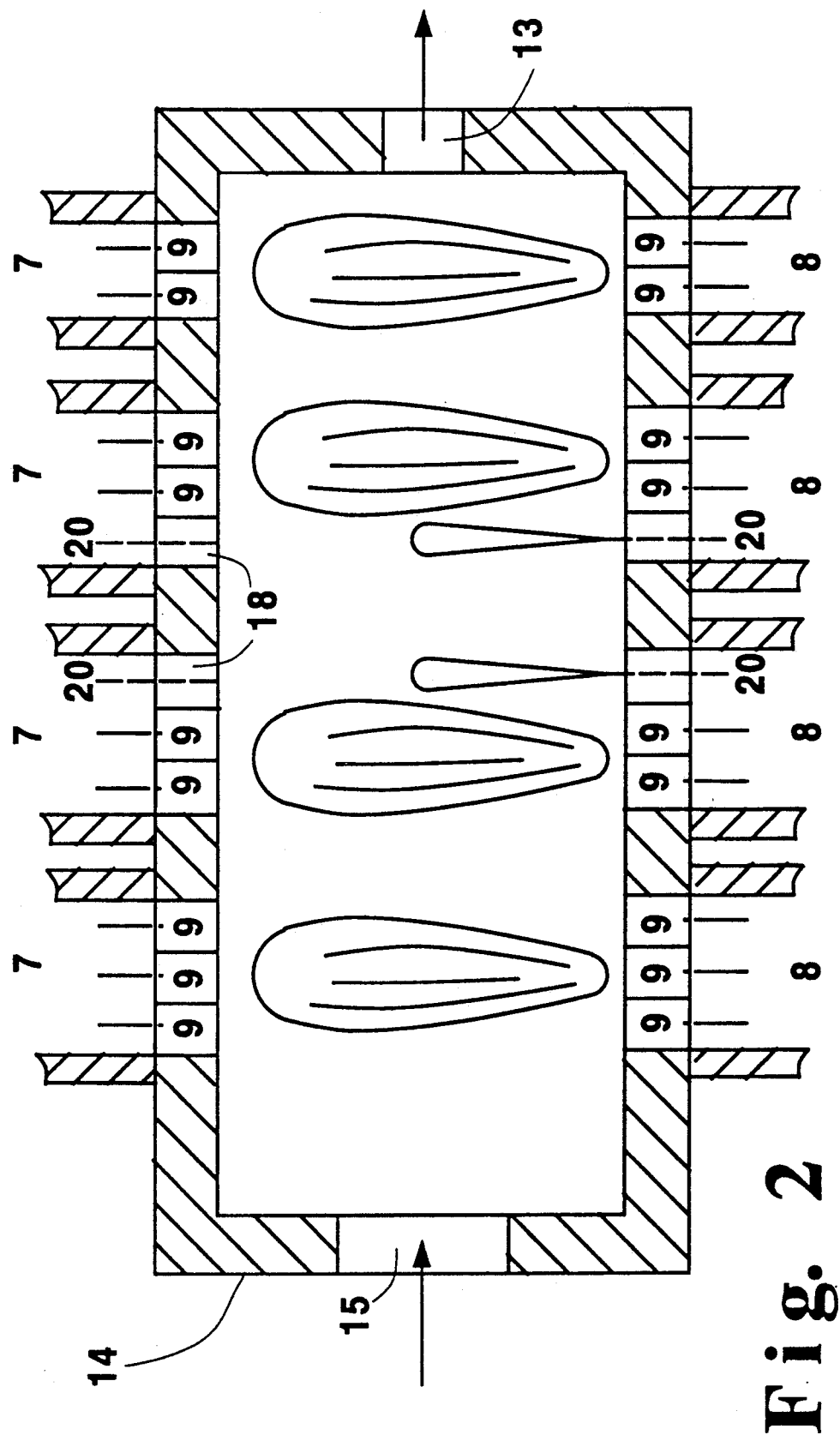
FIG. 2 is a plan view of one embodiment of a cross-fired regenerative furnace of the present invention showing right side ports during their firing cycle and left side ports during their exhaust or off-firing cycle.

Referring to FIGS. 1 and 2, a cross-fired regenerative furnace (1) having a melting chamber (2) flanked by a pair of regenerators (3 and 4) is illustrated in cross-sectional and plan views. Each regenerator (3 and 4) includes a refractory housing (5) containing refractory materials (6) stacked in a checkerboard fashion that permits the alternate passage of air and exhaust gas. Each regenerator (3 and 4) communicates with the melting chamber (2) via a plurality of air ports (7 and 8). Under the ports or in the side-walls adjacent to the ports, at least one air-fuel refractory block (9) and at least one modified refractory block (18) are located. While at least one fuel lance (9a) is placed within at least one air-fuel refractory block (9), at least one auxiliary oxygen-fuel burner is recessed within at least one passageway of at least one modified refractory block (18).

The melting chamber (2), which is in communication with said plurality of ports (7 and 8) and refractory blocks (9 and 18), has a refractory bottom (10), a refractory roof (11), refractory side-walls (12), refractory exit area (13) and a refractory back-wall (14). Glass forming ingredients are fed to this melting chamber (2) from an inlet means (15). The glass forming ingredients are melted with burners located within the ports and then exit through the exit area (13).

The glass forming ingredients are a mixture of high temperature melting raw materials used in the manufacture of glass. The mixture make-up is dependent on the type of glass being produced. Normally, the mixture comprises, inter alia, silica containing materials including scrap glass referred to as cullet. Other glass making raw materials including feldspar, limestone, dolomite, soda ash, potash, borax and alumina may be used. To alter the properties of the glass, a minor amount of arsenic, antimony, sulfates and/or fluorides needs to be added. Moreover, color forming mental oxides can be added to obtain the desired color.

Figure 3:
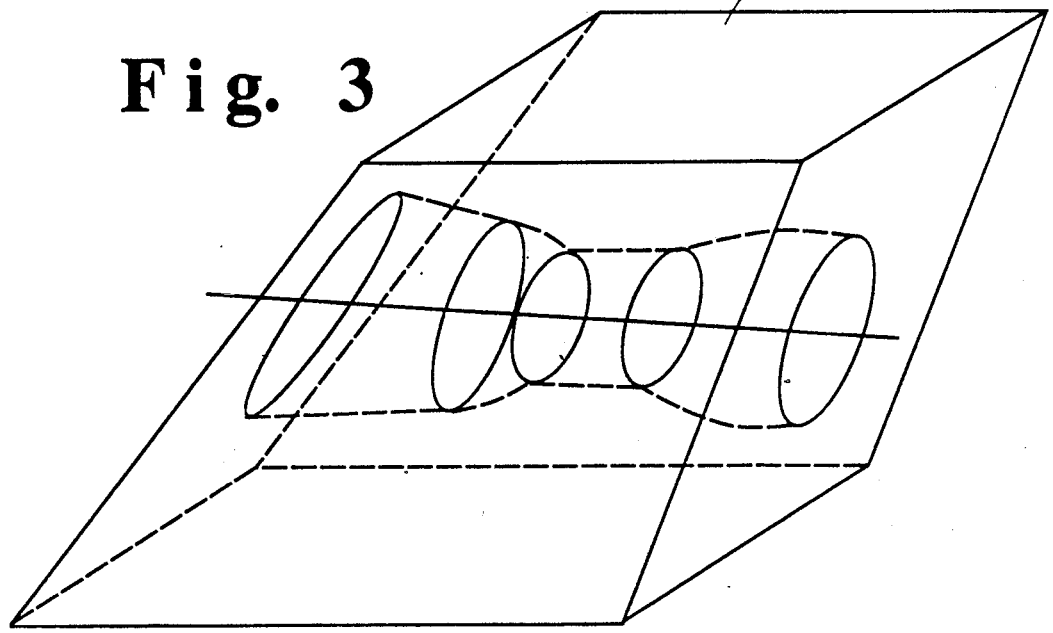
FIG. 3 is a cross-sectional view of a conventional refractory block for the air-fuel lance.

The interior of the melting chamber (2) is heated in part by the combustion of fuel in the presence of preheated air. Various fuels, including gaseous fuels, liquid fuel and powdered fuels may be introduce via at least one fuel lance which is placed in a converging-diverging shape passageway of at least one refractory block (9) as shown in FIG. 3. During an initial combustion cycle, air passes from the left regenerator (3) through a plurality of ports (7) and enters into the melting chamber (2) while the combustion products (gases) are removed through a plurality of ports (8) into the right regenerator (4) where heat is recovered from the combustion products via the refractory checker (6) located in the regenerator (4). In the next combustion cycle, the operation is reversed, with air passing from the right regenerator (4) through a plurality of the ports (8) into the melting chamber (2) and with the combustion product exhausting through a plurality of ports (7) into the left regenerator (3) where heat is recovered by means of the refractory checkers (6) located in the regenerator (3). The air is preheated as it passes through heated refractory checkers (6). The flow of air (the direction of combustion) is periodically reversed, for example, each 30 minutes, in the above manner by using, for example, valves (not shown).

The interior of the melting chamber (2) is also preferably heated in part by at least one oxygen-fuel auxiliary burner (20). The oxygen/fuel auxiliary burners (20) located under or adjacent to a plurality of ports (7 and 8) fire alternately, parallel to the air-flames, following the firing sequence of the air-fuel burners located under or adjacent to the ports (7 and 8). When, for example, the air-fuel burners on the left side fires, at least one oxygen/fuel burner (20) on the same side fires. Meanwhile, all burners (air plus oxygen) located on the right port side are shut down. This firing technique, in addition to a specific placement, enables the oxygen-fuel flame to efficiently provide heat without disrupting the momentum of the air-fuel flames, thereby minimizing the amount of fuel employed.

The oxygen-fuel auxiliary burner (20) may also be used as the sole source for heating the interior of the melting chamber. When the air-fuel burners are no longer effective or operational, a sufficient number of oxygen-fuel burners should be employed so that the glass melting rate of a cross-fired regenerative furnace can be maintained. By installing the oxygen-fuel burners in lieu of the existing fuel lance 9(a), a sufficient number of the oxygen-fuel auxiliary burners can be employed. The oxygen-fuel auxiliary burners can also be used similarly as the air-fuel burners since the oxygen-fuel burners are similarly located as the previously operated air-fuel burners. The furnace, therefore, need not be shut down when the regenerators are being repaired to restore the air-fuel burners to their original, operable state.

The temperature of the flame imparted by the oxygen-fuel auxiliary burner is usually dependent on the quality of the fuel and the oxygen-fuel ratio. The oxygen employed may be in the form of oxygen-enriched air having an oxygen concentration of more than 21 percent or preferably at least 50 percent or may be technically pure oxygen having an oxygen concentration of 99.5 percent or more. The temperature of the flame of a auxiliary oxygen-fuel burner is generally at about 2780° C. In some cases, oxygen-burners with lower flame temperatures could also be used.

The oxy-fuel auxiliary burner (20) includes a cylindrical pipe (21) coupled to an oxygen source (not shown) via a coupling means (22). The cylindrical pipe (21) terminates in a nozzle tip (23) from which the oxygen is emitted. A tube (24) is coaxially positioned within the pipe (21). A fuel source (not shown) is coupled to the tube (24) via a coupling means (22) so that the fuel fed to the tube (24) can be emitted from the nozzle tip (23). The coupling means (22) comprises two separate chambers (22-a) and (22-b), which are connected by binding means including a gasket (22-c) and screws (22-d). The chamber (22-a), which is in communication with the pipe (21), is aligned with the chamber (22-b) to form a coupling means (22) having a cylindrical shape. A water jacket (not shown) can be provided to cool or reduce the temperature of the oxygen-fuel auxiliary burner. Both the cylindrical pipe (21) and the tube (24) of the burner could be bent or angled or straight to fit into a modified refractory block (18) having an inclined or straight passageway.

Figure 4:
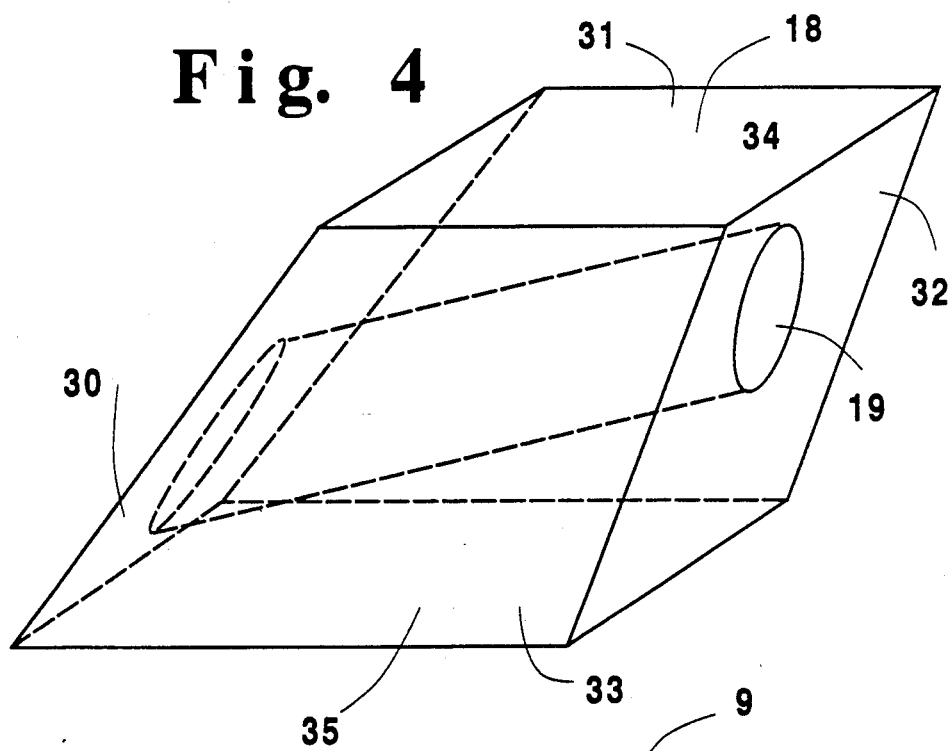
FIG. 4 is a cross-sectional view of a modified refractory block for the oxygen-fuel auxiliary burner useful in the practice of this invention.
Figure 5:
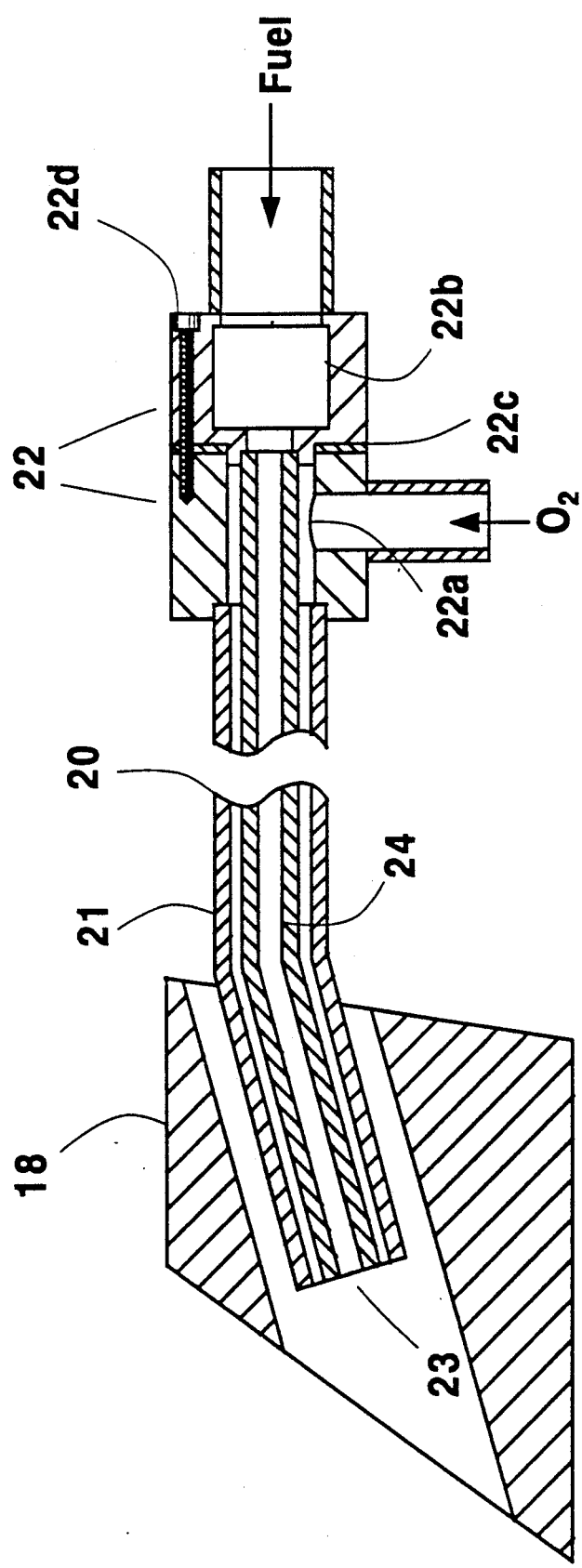
FIG. 5 is a cross-sectional view of one embodiment of a modified refractory block with the oxygen-fuel burner inserted therein.

The modified refractory block (18) in FIGS. 2, 4 and 5 may be substantially in the form of a rectangular-like shape or parallel-piped-like shape. Its size and shape, however, generally correspond to the external size and shape of a conventional refractory block for air-fuel burners (such as the one in FIG. 3) so that it can take the place of a conventional refractory block. The modified refractory block usually comprises sides (33 and 34), a face (30), a back (32), a top (31) and a bottom (35). On the bottom portion of the face (30), a passageway (19) is present. The passageway (19) extends from the face (30) to the opposite surface, the back (32), in an obliquely rising manner. The design of the passageway (19) is such that an oxygen-fuel auxiliary burner can be accommodated to direct its flame toward a specific area, such as the batchline. The shape, size and angle of inclination of the passageway are such that the flame of the oxygen-fuel burner is localized to provide heat to burner a specific area where a high temperature condition is needed without touching the refractory wall, thereby minimizing the amount of oxygen and fuel needed in a glass melting process and minimizing refractory wall losses. The passageway may be cylindrically designed.

The following example serves to illustrate the invention. It is presented for illustrative purposes and is not intended to be limiting.

EXAMPLE

A cross-fired regenerative furnace with a capacity of over 170 TPD (tons per day), having only air-fuel burners, was employed in manufacturing bottle glass. Because of decreasing regenerator performance, the glass production rate subsequently decreases. Using 3% $O_2$-enrichment, 360 $Nm^3/O_2/hr$, a maximum production increase of 20 TPD was achieved. However, with the further deterioration of the regenerator, the necessary production rate could not be maintained. To this cross-fired regenerative furnace, oxygen-fuel burners were provided to heat without disrupting the momentum of the air flames. In order to accomplish the task, burners and burner blocks, such as are illustrated in FIGS. 4 and 5, were installed in the furnace.

Two conventional oil burner blocks (one on each side of the furnace) were replaced with two new modified blocks as shown in FIGS. 4 and 5. The oxygen-fuel burners, each with a capacity of about 100 $Nm^3$ natural gas/hr, were then placed into the passages in the modified blocks, which communicate with the melting chamber. The burners were intensively used and inspected several times. After one month, two additional oxygen-fuel burners (one on each side of the furnace), shown in FIG. 5, were installed so that the total firing could reach about 200 $Nm^3$ natural gas/hr. An increased production rate of 20 TPD was achieved with a gas flow of about 140 $Nm^3/hr$ and 260 $Nm^3$ $O_2/hr$, using commercially produced oxygen.

Generally, the installation of at least one oxygen-fuel auxiliary burner in a cross-fired regenerative furnace is difficult due to the restraints imposed by the regenerators located on the lateral side of the furnace. The use of at least one oxygen-fuel burner also may not be economical since it may cause a less efficient fuel usage of the air burners and may reduce the life of a furnace by overheating. Moreover, drilling holes into the refractory lining of the furnace to install at least one oxygen-fuel burner may adversely affect the life of the furnace and the life of the installed oxygen-fuel auxiliary burner. These problems are solved by placing at least one modified block, in lieu of at least one conventional air-fuel block existing in the furnace, to accommodate a particularly designed oxygen-fuel auxiliary burner. The oxygen-fuel auxiliary burner recessed within at least one passageway of the modified block provides its flame in a localized manner to heat a specific area without touching the walls and is operated to avoid disruption of the flame momentum of the air burners. The oxy-burner or oxy-burners installed in this manner are useful in increasing the glass production rate without overheating the furnace and useful in providing flexibility to a glass manufacturing process by being able to operate the furnace even when its regenerators are not functioning properly.

Although the invention has been described in detail with reference to certain specific embodiments, those skilled in the art will recognize that there are other embodiments within the spirit and scope of the claims.

What is claimed is:

1. A process for melting raw glass forming ingredients in a cross-fired regenerative furnace having at least two regenerators which communicate with a melting chamber through a plurality of ports along the lateral sides of the melting chamber having a bottom, a roof, side-walls, raw ingredients inlet means and melt outlet means, comprising; heating the raw glass forming ingredients and the resulting melt in the melting chamber by using burners placed under or adjacent to some or all of said plurality of ports, said burners comprising air-fuel burners and at least one oxygen-fuel auxiliary burner which is operated to heat a specific area in the melting chamber without substantially disrupting the flame momentum of the air-fuel burners, wherein said at least one oxygen-fuel auxiliary burner is bent, angled or inclined to direct its flame toward the batchline or in the vicinity of said batchline.

2. A process according to claim 1, wherein at least one modified oxygen-fuel auxiliary burner located in said lateral sides of the melting chamber is operated to fire alternately substantially parallel to the air flames, following the firing sequence of said air-fuel burners so that the flame momentum of the air-fuel burner is not disrupted.

3. A process according to claim 1, wherein at least one modified refractory block having at least one cylindrical passageway therethrough is placed under or adjacent to said plurality of ports to accommodate said at least one oxygen-fuel auxiliary burner.

4. A cross-fired regenerative furnace having at least two regenerators which communicate with a melting chamber via a plurality of ports along the lateral sides of the melting chamber having a bottom, a roof, side-walls, inlet means and outlet means, wherein burners are placed under or adjacent to some or all of said plurality of ports, said burners comprising air-fuel burners comprising fuel lances and at least one oxygen-fuel auxiliary burner positioned substantially parallel to said fuel lances so that a specified area of the melting chamber can be heated without substantially disrupting the flame momentum which is emitted from the air-fuel burners, wherein said at least one oxygen-fuel auxiliary burner comprises a tube for passing a fuel, which is coaxially placed within a cylindrical pipe for passing oxygen, said at least one oxygen-fuel auxiliary burner being placed in at least one passageway of at least one modified refractory block located under or adjacent to some or all of said plurality of ports in a substantially parallel relationship with at least one refractory block which is designed to accommodate at least one of said fuel lances.

5. A process according to claim 3, wherein the number of said modified refractory blocks employed corresponds to the number of the oxygen-fuel burners employed.

6. A process according to claim 3, wherein said at least one passageway is inclined.

7. A process according to claim 5, wherein at least four oxygen-fuel burners are employed.

8. A process according to claim 3, wherein said at least one oxygen-fuel auxiliary burner is recessed within said at least one passageway of said at least one modified block.

9. A cross-fired regenerative furnace according to claim 4, wherein said at least one refractory block has an inclined passageway.

* * * * *